D. WILLIAMS.
PIPE SUPPORT AND CLAMP.
APPLICATION FILED JULY 28, 1909.
958,052.
Patented May 17, 1910.
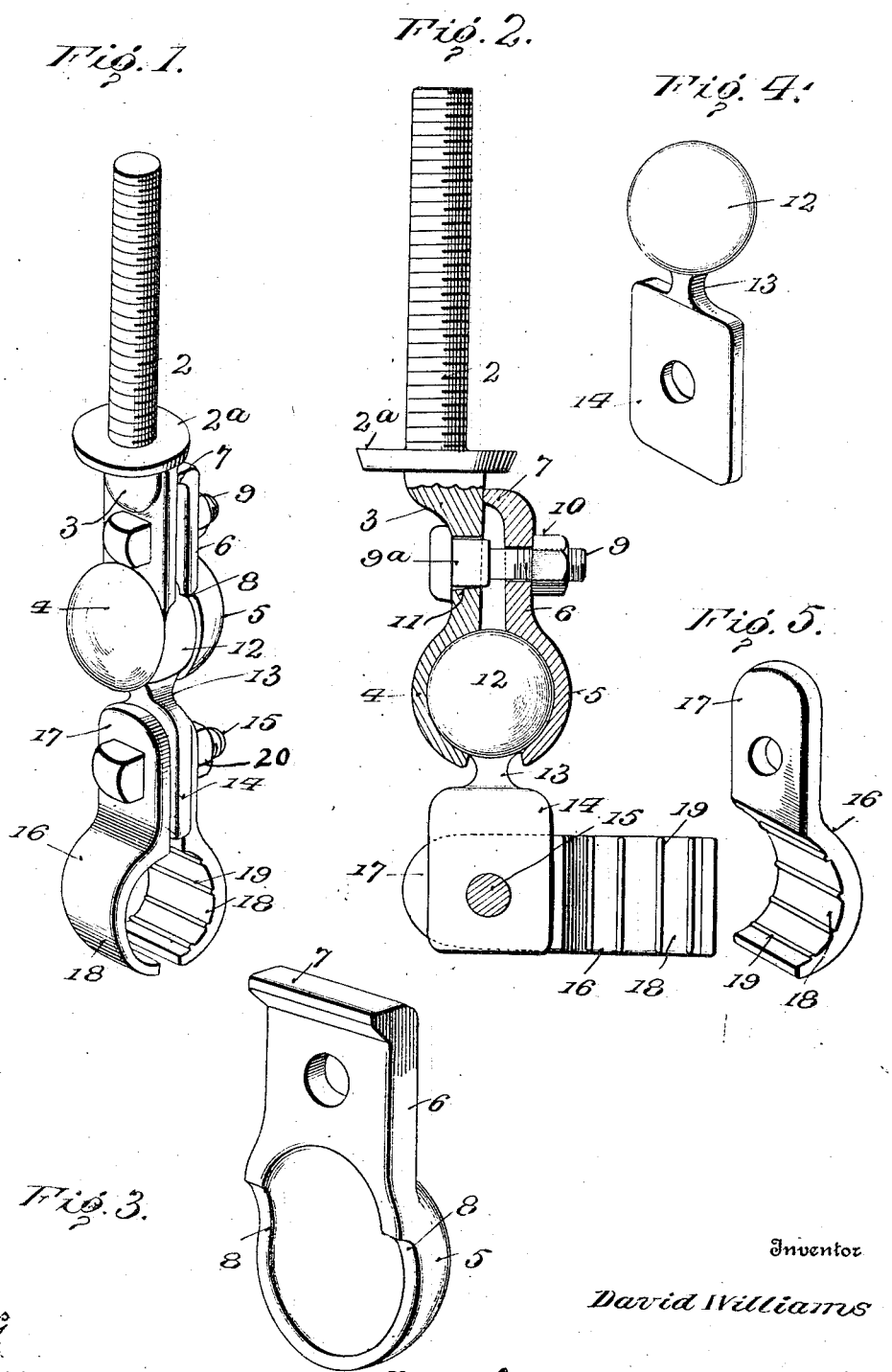
Inventor
David Williams

UNITED STATES PATENT OFFICE.

DAVID WILLIAMS, OF GREENSBORO, NORTH CAROLINA.

PIPE SUPPORT AND CLAMP.

958,052.

Specification of Letters Patent. Patented May 17, 1910.

Application filed July 28, 1909. Serial No. 509,986.

*To all whom it may concern:*

Be it known that I, DAVID WILLIAMS, a citizen of the United States, residing at Greensboro, in the county of Guilford and State of North Carolina, have invented certain new and useful Improvements in Pipe Supports and Clamps, of which the following is a specification.

My invention relates to pipe supports and clamps, and particularly to improvements on the support and clamp shown in Patent No. 892,105, granted to C. P. White on the 30th day of June, 1908. The variety of pipe support therein shown is adapted for holding the pipe upon a beam, a ceiling, a wall, or floor, and is peculiarly adapted for supporting steam pipes upon the sill beams of railway cars and also along the walls of factories or in like positions, the pipe clamp being readily adjustable upon the hanger portion of the support to permit the pipe to assume an angular or other position necessary to properly sustain it.

The object of this invention is to so improve the support and clamp above referred to that the range of its adjustability shall be largely increased so that the pipe may be carried in positions not possible with the other device and so that the support may be thereby adapted for use in situations for which it was not before capable of use.

For a full understanding of the invention and the merits thereof, and to acquire a knowledge of the details of construction, reference is to be had to the following description and accompanying drawing, in which:

Figure 1 is a perspective view of my pipe support and clamp; Fig. 2 is a side elevation, partly in section, of said clamp; Fig. 3 is a perspective detail view, enlarged, of one of the socket members; Fig. 4 is a detail view, enlarged, of the ball member; Fig. 5 is a detail view of one of the pipe-clamping members.

Corresponding and like parts are referred to in the following description and indicated in all the views of the drawing by the same reference characters.

Referring to the figures, 2 designates a screw-threaded support adapted to be inserted into a wooden sill or other framing timber. This support at its lower end is formed with a shoulder $2^a$. Below the shoulder the hanger is downwardly extended to form a shank 3 and is formed at its lower end with a semispherical socket member 4. The other socket member 5 is formed on the end of a plate 6, the upper end of which plate is angularly bent as at 7, this angularly bent end being adapted to contact with the inside face of the shank 3 of the socket member 4. Both of the semispherical sockets 4 and 5 are cut away on their side edges as at 8 to provide space to accommodate the shank 13 of the ball-carrying member and permit the latter to be swung to various angles to the sections 4 and 5, thereby securing an extended range of angular adjustment in addition to the torsional adjustment provided by rotating the ball adjustment within the socket members. A bolt 9 passes loosely through the shank 3 and the shank 6, and a nut 10 threaded on the bolt is adapted to clamp the two members 3 and 6 against each other and into tight engagement with the ball 12. The shank 3 is formed with a square opening 11 through which the squared end $9^a$ of the bolt 9 passes. Thus, the bolt 9 is held from rotation with relation to the shank 3, thus permitting the nut 10 to be tightened up on the bolt with greater ease as the bolt does not have to be held from rotation with a wrench. The ball 12 fits between the socket members 4 and 5. Projecting from one portion of the ball is the shank 13 which at its lower end is widened and flattened to form a plate 14 having flat outer faces, this plate being perforated for the passage of a transverse bolt 15.

16 designates opposed pipe-clamping members, each formed with a flat plate-like shank 17 adapted to fit against and contact with the face of the portion 14, and each provided with the semi-cylindrical jaw 18, the inner face of which is provided with a plurality of transverse teeth or ribs 19 adapted to bite into the pipe and thus secure a firm hold thereon. A nut 20 on the bolt 15 is adapted to be turned down on the bolt and clamp the members 16 in place against the opposite sides of the plate 14.

It will be obvious that the clamping members 16 may be rotated with relation to the plate 14 to any desired angular adjustment. Thus, the hangers may be turned at right angles to the plate 14, as shown in Fig. 2, or the ball member with the plate 14 might be turned upward at right angles with the socket members, and the clamping members be likewise held at right angles to the longitudinal axis of the ball member. When turned in this position, that is, the ball member at right angles to the socket members, the ball member may be rotated with the socket members so that any desired angular adjustment of the clamping members may be made. It will be seen then that the ball member is angularly and rotatably adjustable with relation to the socket member, and that the clamping members are angularly adjustable with relation to the ball member, and that thus a large variety of adjustments may be secured, not possible with the device forming the subject of the patent heretofore referred to. For instance, the device forming the subject of the patent could not have the clamping members turned at right angles with the axis of the hanger or ball-carrying member and yet have the clamping members turned so that the axis of the jaws should be horizontal, while this adjustment is entirely possible with my device.

I wish it understood that while I have shown the ball 12 and the interior faces of the sockets as plain, I do not wish to limit myself to this, as it is obvious that the ball and sockets may be scored or roughened, as shown in the before cited patent to White. Neither do I wish to limit myself to any particular application of this support, as it might be used for other objects than pipes. All the parts, with the exception of the bolts and nuts, are intended to be made of malleable cast iron and are therefore particularly strong and durable and not liable to breakage under the rough usage to which they are liable to be subjected.

Having thus described the invention, what I claim is:—

1. A pipe support and clamp comprising a supporting member having a flat shank formed at its end with a solid hemispherical socket, an independent plate formed with a complementary solid hemispherical socket and adapted to be adjustably clamped against said shank, a member having at one end a ball fitting in said sockets, a contracted neck, a flat-faced enlarged shank, clamping members, each formed with a curved jaw and a flat plate-like portion engaging on opposite sides of the shank of the ball-carrying member, and a bolt passing through the clamping members and said shank.

2. A pipe support and clamp comprising a supporting member having a flat shank formed at its end with a solid hemispherical socket, a detachable plate formed with a complementary solid hemispherical socket and adapted to be clamped against said flat shank, both of said sockets being cut away on their side edges, a member having at one end a ball fitting between said socket members, said ball member having a neck projecting out through the cut-away portions of the socket, the other end of the member being formed with a widened shank having opposed flat faces, opposed clamping members, each formed with a curved jaw and a flat plate-like portion engaging on opposite sides of the shank of the ball member, and a bolt passing through the clamping members and said shank.

3. A pipe support and clamp including a supporting member having a flat shank formed at its end with a solid hemispherical socket, said shank being formed above the socket with a many-sided opening extending through it, a detachable plate adapted to be engaged against the flat shank and having formed therewith a complementary solid hemispherical socket, said plate having an opening therethrough for the passage of a bolt, a bolt passing through the plate and said shank, said bolt being provided with a many-sided shoulder adapted to engage the many-sided opening in the shank, a member having at one end a ball fitting in said socket, a contracted neck extending over the ball, a flattened laterally widened shank, opposed clamping members located one on each side of said shank, and a bolt passing through the clamping members and the shank, said bolt pivotally connecting the clamping members to the shank and also acting to close the clamping members upon the part to be clamped.

In testimony whereof I affix my signature in presence of two witnesses.

DAVID WILLIAMS. [L. S.]

Witnesses:
  FREDERIC B. WRIGHT,
  W. N. WOODSON.